Nov. 25, 1969     B. HOWLAND ET AL     3,479,744

CONVERTIBLE TORSION MEASURE

Filed April 29, 1968     4 Sheets-Sheet

INVENTORS
BRADFORD HOWLAND
STEPHEN JAY WIESNER
BY
*Jack Larson*
ATTORNEY

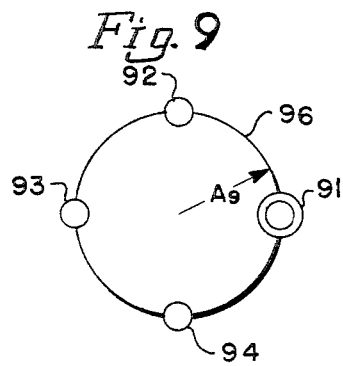
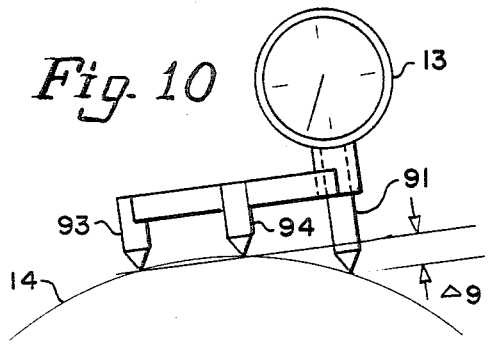
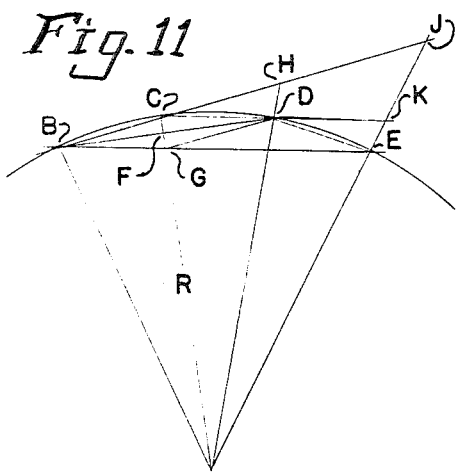
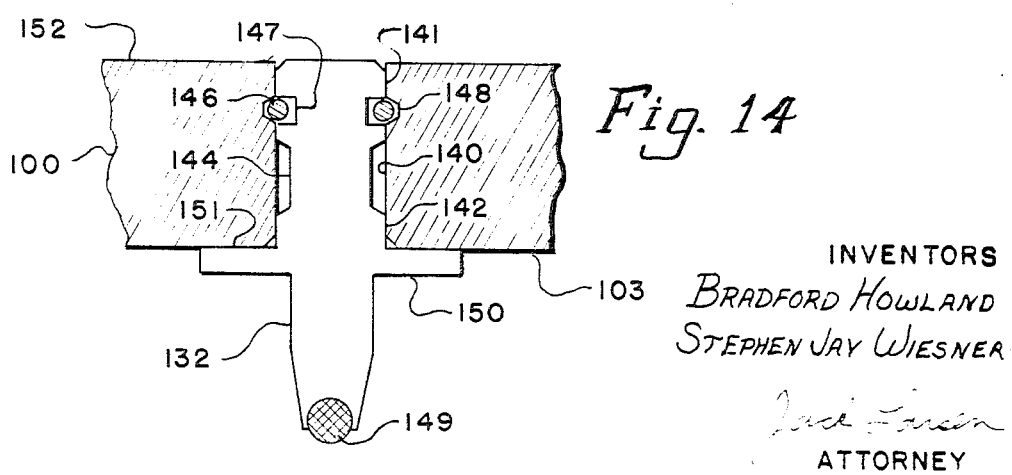

INVENTORS
BRADFORD HOWLAND
STEPHEN JAY WIESNER
BY
Jack Larsen
ATTORNEY

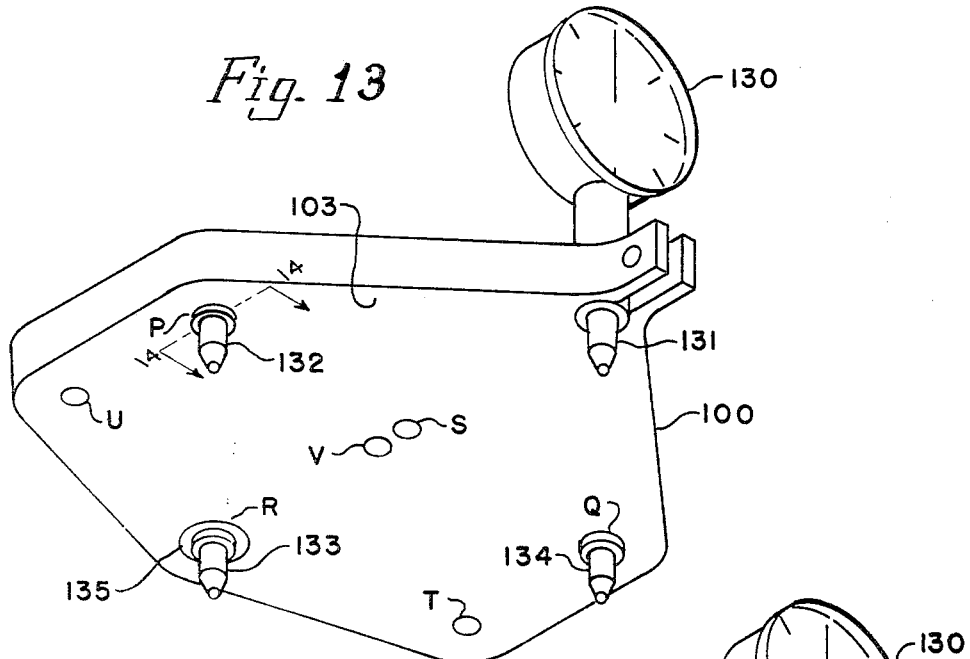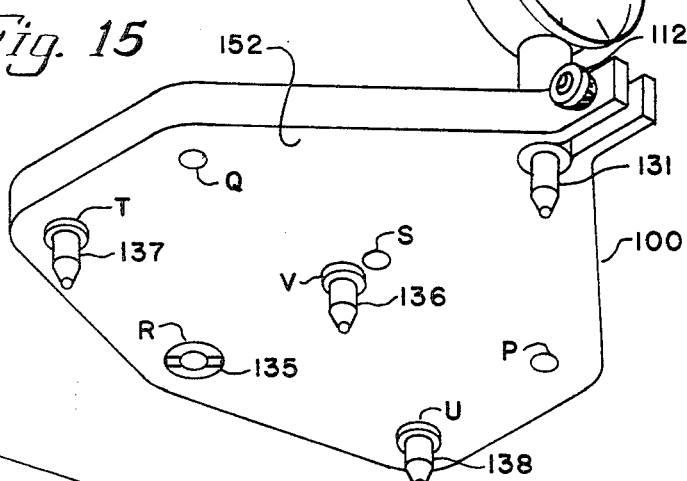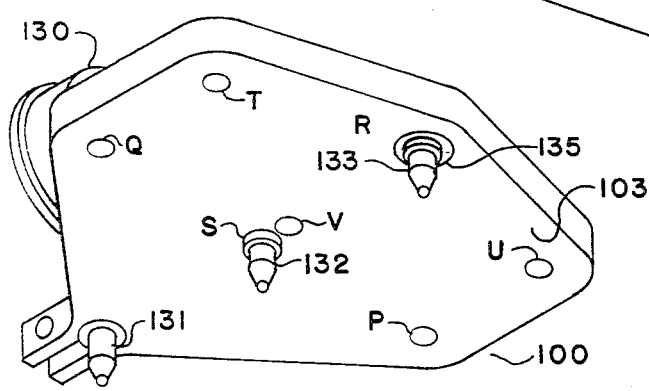

ent. Similarly the torsion, which is determined
by the difference in the curvatures, may be a small difference between the two relatively large numbers and
subject to the well known error inherent in such measurement.

United States Patent Office 3,479,744
Patented Nov. 25, 1969

3,479,744
CONVERTIBLE TORSION MEASURE
Bradford Howland, 2161 Massachusetts Ave., Cambridge,
Mass. 02140, and Stephen Jay Wiesner, 61 Shattuck
Road, Watertown, Mass. 02172
Filed Apr. 29, 1968, Ser. No. 724,961
Int. Cl. G01b 3/22, 5/20
U.S. Cl. 33—172                                    20 Claims

ABSTRACT OF THE DISCLOSURE

A torsion measure is disclosed with contact points at the corners of a unit square wherein the deflection of one corner from the plane defined by the others is shown to be a measure of geodesic torsion. By employing an unconventional configuration the same instrument is readily converted to perform the functions of spherometer and three-point lens measure. By judicious choice of scale factors the instrument is uniquely adopted to determine Gaussian curvature and to use as its measuring element standard dial indicators calibrated in thousandths of inches and hundredths of millimeters.

---

Figure 1:
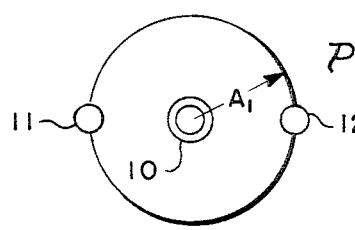

This invention relates to gages and more particularly to mechanical curvature gages, especially a surface measure adapted to determine both geodesic torsion and mean curvature in terms to permit straight-forward calculation of total curvature or Gaussian curvature.

Two classes of mechanical instruments are in general usage for the measurement of surface curvature. One of these, known as a "lense measure," comprises a rigid frame with a pair of fixed contact points extending out from the frame and spaced apart by a convenient distance (ordinarily about an inch) bracketing a third and moveable contact point which is constrained by the frame to move along a measuring axis which is a perpendicular bisector of the base line between the two fixed contact points. The displacement of the moveable point from the base line is read on a dial indicator. In use, an operator places the instrument in contact with the surface with the measuring axis substantially normal to the surface. He then rotates the instrument about the measurement axis and observes the deviation of the dial indicator. In general, a maximum and a minimum curvature will be observed. These values expressed as reciprocal radii are known as the "principal normal curvatures" of the surface point. Depending on the case, both may be positive, both may be negative, or the maximum may be positive and the minimum negative. Having so determined the principal normal curvatures, the "total curvature," (which is the product of the principal normal curvatures) the "mean curvature" (which is the sum of the principal normal curvatures) and the geodesic torsion (which varies as the difference of the principal normal curvatures) all may be calculated. Where the mean curvature is the parameter of interest, a "spherometer" is the instrument of choice. This instrument has three fixed contact points located at the vertices of an equilateral triangle and a fourth contact point which is moveable, constrained to a measuring axis perpendicular to the plane determined by these three fixed points and passing through the center of a circumscribing circle. The displacement of the measuring point from the plane is a measure of the mean curvature. independant of however much cylindrical curvature may also be present and independant of the orientation of the contact points with respect to the directions of principal normal curvature.

When one of the principal normal curvatures is small, the error in a measurement of the total curvature with these instruments may be large, expressed as a percentage of the measure. Similarly the torsion, which is determined by the difference in the curvatures, may be a small difference between the two relatively large numbers and subject to the well known error inherent in such measurement.

What has been needed is an instrument analogous to the spherometer which will make a direct measurement of the *difference* between the principal normal curvatures while ignoring their sum. It is an object of the present invention to provide a torsion measure which measures, for example, the cylindrical power of a lens without regard for its magnification, which therefore can be used to detect small astigmatic errors in the lens.

Although the total curvature is defined as the product of the two principal normal curvatures, this product may be determined without an explicit determination of either of the principal normal curvatures per se. In particular, a spherometer provides a measure of the sum of the two principal normal curvatures while the torsion measure provides the difference between the principal curvatures. If one obtains from a spherometer the square of the *sum* of the principal normal curvatures, and from a torsion meter the square of the *difference* between the principal normal curvatures, the product of the normal curvatures is seen to be a quarter of the difference of these two squares.

It is an object of the invention to provide an instrument which measures both torsion and mean curvature with appropriate scale factors so that total curvature may be determined by the quarter square method. A feature by which the above objects are attained is a rigid block, to which moveable pins may be fixed in the geometry of lens measure, spherometer or torsion measure, together with a dial indicator (or other measuring instrument) to cooperate with the other contact points to function as one or other form of the above described instruments.

Another feature of the invention is the employment in the various instruments so formed in a modification of the more commonly used devices in which the measuring point is at an extreme, rather than in a medial, position.

Figure 2:
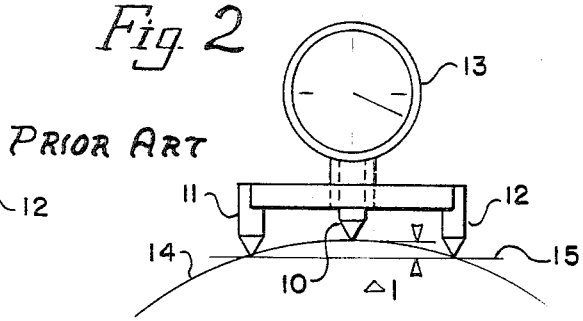
Figure 3:
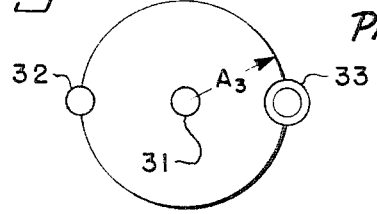
Figure 4:
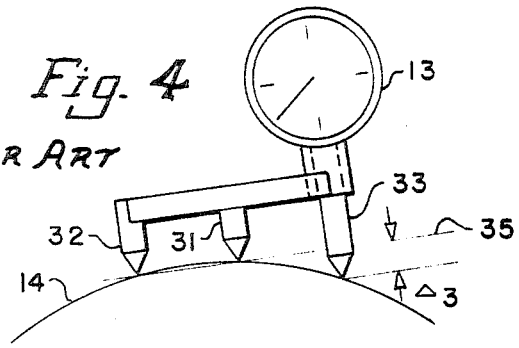
Figure 5:
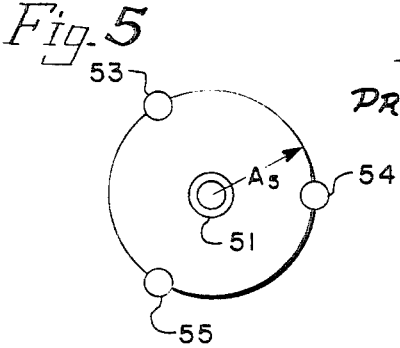
Figure 12:
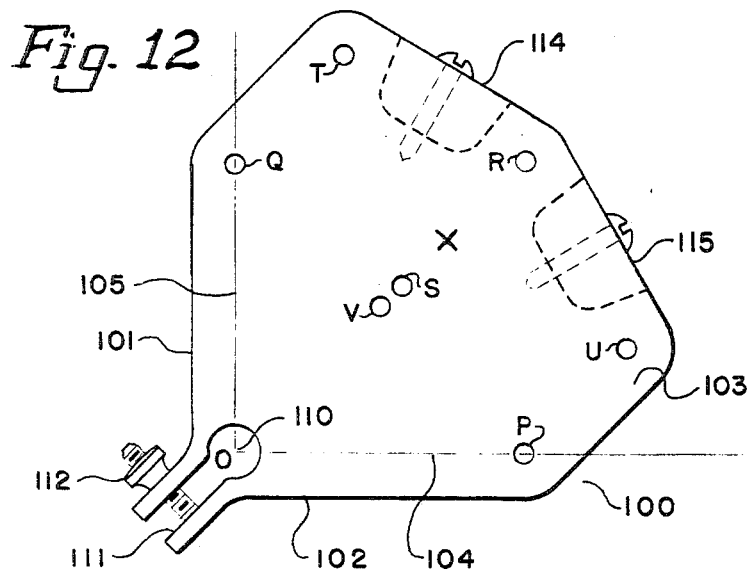
Figure 17:
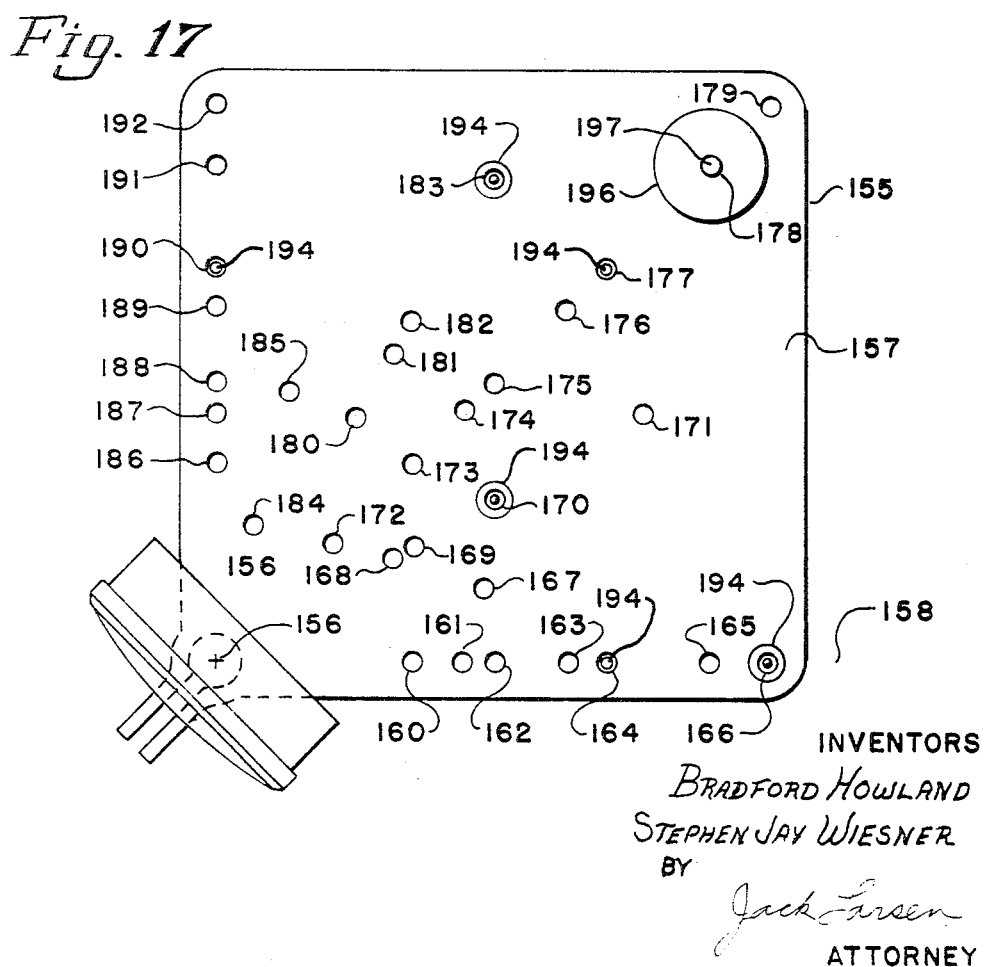

Other objects and features of the invention will be apprehended from the following description and annexed drawings of which:

FIG. 1 represents in plan, and
FIG. 2 in elevation, a common form of three-point lens measure,
FIG. 3 represents in plan, and
FIG. 4 in elevation the modified form of three-point lens measure;
FIG. 5 is a drawing in plan, and
FIG. 6 in elevation indicating the common arrangement of contact points of a spherometer;
FIG. 7 represents in plan, and
FIG. 8 in elevation, the modified form of spherometer;
FIG. 9 is a drawing representing in plan, and
FIG. 10 a figure representing in elevation the arrangement of a surface torsion measure in accordance with the present invention;
FIG. 11 is a geometrical diagram illustrative of the principal of operation of the devices as shown in FIGS. 1 through 10;
FIG. 12 is a drawing showing in plan, the arrangement of contact points in a convertible surface measure in accordance with the present invention;
FIG. 13 is an isometric sketch showing an embodiment of the invention arranged as a torsion measure;
FIG. 14 is a section taken through the embodiment of FIG. 13;
FIG. 15 is a view of the embodiment of FIG. 13 arranged as a spherometer;
FIG. 16 is a view of the embodiment of FIGS. 13 and 15 arranged as a three-point lens measure;

FIG. 17 is a plan view of an alternative embodiment of the invention.

The principle of operation of the well-known standard three point lens measure is shown in FIGS. 1 and 2. A moveable measuring point 10 is flanked by diametrically opposed fixed points 11 and 12. A dial indicator 13 carries the measuring point and indicates its motion along the measuring axis. In FIG. 2 these points are shown in elevation in contact with a cylindrical surface 14 having a first principal normal radius $r_1$ of curvature equal to $R_1$; and $1/r_2$ equals zero (FIGS. 2, 4, 6, 8 and 10 are right circular sections through the cylindrical surface 14). Placing the points 10, 11, 12 in contact with the surface 14 the point 10 is displaced from the line 15 interconnecting points 11 and 12 by an amount $\Delta_1$. It can be shown that:

$$\Delta_1 = \frac{A_1^2}{2R} \quad (1)$$

to a first approximation, where $A_1$ is the radius of the circle containing the points 11 and 12 centered on the axis of the moveable point 10.

FIGS. 3 and 4 represent the modified three-point instrument with a first fixed point 31, a second fixed point 32 on a circle at a radius $A_3$ and a measuring point 33 diametrically opposed to the fixed point 32 shown in FIG. 4. Normal curvature of a surface may be measured by placing the three points in contact with the surface. In this configuration, the displacement $\Delta_3$ of the point 33 from the line 35 containing the points 31 and 32 is twice as great as the displacement of the measuring point in FIGS. 1 and 2. Thus $$\Delta_3 = \frac{A_3^2}{R} \quad (2)$$

Figure 6:
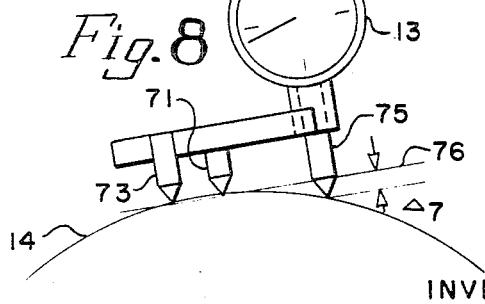
Figure 7:
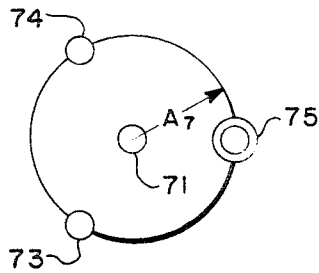

It can be shown that a conventional spherometer as illustrated by FIGS. 5 and 6, measures the mean curvature $K'$ of a surface independent of the orientation of the instrument with respect to the principal normal curvatures of the surface. The standard spherometer schematically shown in FIGS. 5 and 6 has a measuring point 51 and three fixed contact points 53, 54 and 55 located on a circle centered at the point 51 and having a radius $A_5$. When this instrument is placed in contact with the cylindrical surface 14 having a radius of curvature R, the displacement of the point 51 from the plane determined by the points 53, 54 and 55 is independent of the orientation of the points. In FIG. 6 the elevation of such an instrument is shown situated with the points 53 and 55 defining a line parallel to the axis of the cylinder. The radius connecting points 54 and 51 lies in the plane of the section; and the projections on this plane of the other two radii of the instrument to the points 53, 55 and $A_5/2$, half of the radius $A_5$.

In the projection of FIG. 6 the plane 56 determined by the points 53, 54 and 55 is parallel to the axis of the cylinder and the displacement $\Delta_5$ of the point 51 from this plane is shown to be:

$$\Delta_5 = \frac{A_5^2}{4R} = \frac{A_5^2 K'}{4} \quad (3)$$

where $K'$ is the mean curvature of the surface.

Figure 8:
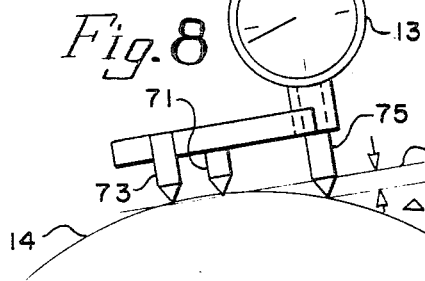

In the configuration in FIGS. 7 and 8 the point 71 at the center is a fixed point as are the points 73 and 74. The moveable point 75 is equally spaced between the points 73 and 74 on the circle centered at the point 71 of radius $A_7$. FIG. 8 represents the modified instrument in contact with a cylinder 14 of radius R with the points 73 and 74 on a line parallel to the axis of the cylinder. The plane determined by the fixed points 71, 73 and 74 is likewise parallel to the axis of the cylinder. The displacement $\Delta_7$ of the measuring point 75 from this plane 76 is seen to be three times as great as the displacement resulting from the configuration of FIGS. 5 and 6.

$$\Delta_7 = \frac{3A_7^2}{4R} \text{ or } \Delta_7 = \frac{3A_7^2 K'}{4} \quad (4)$$

In the torsion measure of FIGS. 9 and 10 a measuring point 91 and three fixed points 92, 93 and 94 are all situated at the corners of a square and on a circle 96 of radius $A_9$. Contacting a cylindrical surface 14 as shown in FIG. 10 with the diameter connecting points 92 and 94 parallel to the axis of the cylinder, the displacement of $\Delta_9$ of the point 91 relative to the plane of points 92, 93, and 94 is seen to be $$\Delta_9 = \frac{A_9^2}{R} \quad (5)$$

Situating the device with sides of the square parallel to the cylinder axis there is no deflection; while with the diagonal connecting points 91 and 93 parallel to the axis the displacement again is $A_9^2/R$ in the opposite direction, thus:

$$\Delta_9 = \frac{A_9^2}{R} \sin 2\theta \quad (6)$$

By definition the torsion of the cylinder of radius R is given by the equation:

$$\frac{1}{t} = \frac{1}{2}\left(\frac{1}{r_1} - \frac{1}{r_2}\right) \sin 2\theta = \frac{\sin 2\theta}{2R} \quad (7)$$

thus:

$$\frac{1}{t_{max}} = \frac{\Delta_{9max}}{2A_9^2} \quad (8)$$

where $\Delta_{9max}$ is the maximum displacement as shown in the situation of FIG. 10.

The derivation of the Relations 1–8 given above will be clear with reference to the geometrical diagram of FIG. 11. It will be understood that the curvatures $1/r_1$, $1/r_2$, $K'$ and the torsion $1/t$ are not *exactly* proportional to the displacement $\Delta$ of the measuring point in any of the above cases but relationships are valid for slight curvatures for which the radii of curvature are large compared to the dimensions of the instrument. Under these circumstances the tangent may be considered to be equal to both the sine and the arc. In FIG. 11 let the figure lie in the plane perpendicular to the axis of the cylinder 14 of FIGS. 2–10, let the points B, C, D and E be successive equally-spaced points on the surface 14 of the cylinder; and let these points be interconnected by chords $\overline{BC}$, $\overline{CD}$, and $\overline{DE}$ of length $x$. Using the small-angle approximation:

$$\angle BOC = \frac{x}{R} = \angle COD = \angle DOE =$$
$$\angle CBG = \angle HCD = \angle KDE \quad (9)$$

and $\overline{CD}$ and $\overline{BE}$ are parallel, $\overline{GD}$ and $\overline{BH}$ are parallel, so $$\angle CBD = \frac{x}{2R} = \angle DBG \quad (10)$$

and $$\overline{CF} = \frac{x^2}{2R} \quad (11)$$

Letting $$x = A_3 \quad (12)$$

and corresponding point 32 to B, 31 to C, and 33 to D. the displacement $\Delta_3$ is seen to correspond to the segment $\overline{HB}$, that is:

$$\Delta_3 = \frac{x^2}{R} = \frac{A_3^2}{R} \quad (13)$$

as stated above.

To fit the situation of FIG. 6

$$x = \frac{A_5}{2} \quad (14)$$

Point 55 is at B and 51 at C and point 54 at E, then:

$$\Delta_5 = \overline{UG} = \frac{x^2}{R} = \frac{A_5^2}{4R} \quad (15)$$

For the configuration of FIG. 8, $$x = \frac{A_7}{2} \quad (16)$$

and point 73 is at B, point 71 at C and point 75 at E, then:

$$\Delta_7 = \overline{JK} + \overline{KE} = \frac{3x^2}{R} = \frac{3A^2}{4R} \quad (17)$$

For FIG. 9, $$x = A_9 \quad (18)$$

Point 91 is at D, point 93 at B, and points 92 and 94 correspond to C, then:

$$\Delta^9 = \overline{DH} = \frac{x^2}{R} = \frac{A_9^2}{R} \quad (19)$$

As mentioned above, total curvature K, also known as "Gaussian curvature," may be calculated from mean curvature and the maximum of the geodesic torsion thus:

$$K = \frac{1}{r_1} \cdot \frac{1}{r_2} = \left(\frac{K'}{2}\right)^2 - \left(\frac{1}{t_{max}}\right)^2 \quad (20)$$

If the mean curvature K' is measured with a spherometer as shown in FIG. 7 and the torsion by a torsion measure as shown in FIG. 9 then: from (4), (8) and (20):

$$K = \left[\frac{1}{2}\left(\frac{4\Delta_7}{3A_7^2}\right)\right]^2 - \left(\frac{\Delta_9}{2A_9^2}\right)^2 \quad (21)$$

where $A_7$ is the radius of the spherometer and $A_9$ is the radius of the torsion measure. If $$A_7 = \sqrt{2/3} \text{ unit} \quad (22)$$

and $$A_9 = \sqrt{1/2} \text{ unit} \quad (23)$$

then $$K = \Delta_7^2 - \Delta_9^2 \quad (24)$$

If $\Delta_7$ and $\Delta_9$ are measured with dial indicators having the same scale factor, then the scale readings may be just squared and subtracted to yield K.

FIG. 12 is a plan for situating a set of seven surface-contacting points proportioned and situated so that the same measuring instrument (such as a dial indicator) may be used at an eighth point situated to measure, relative to selected ones of the other points, the deflections of both a spherometer and a torsion measure, with appropriate scale factors to permit direct subtraction of squares to yield the total curvature K. The base of the instrument is a six-sided plate 100 having a first edge 101 and substantially perpendicular to it, a second edge 102. Generally parallel to these edges about ¼ inch from each of them are a pair of coordinate axes, an x axis 104 and a y axis 105. Centered at the origin O of this coordinate system is a cylindrical hole 110 bored accurately perpendicular to the plate 100. This hole is preferably ⅜ inch diameter to fit the standard shank diameter of dial indicators. The origin of the coordinate system is, therefore, the location of the moveable measuring point for the three configurations of which the convertible surface measure is capable.

In the preferred embodiment of FIGS. 13–16, the set of seven fixed points are situated with respect to the coordinate axes as follows: one inch along the x axis at a point, which is designated (1,0), is fixed point P for the torsion measure. Other fixed points Q and R for the torsion measure are situated on the y-axis at (0,1) and at the coordinates (1,1) respectively. For the spherometer mode of operation, fixed points are as follows: the center S of the spherometer is located on the line: $x=y$ and distant $\sqrt{2/3}$ from the origin at the point $(\sqrt{1/3}, \sqrt{1/3})$. Fixed points T and U are located equidistant from the central point S at coordinates $(\sqrt{1-\sqrt{3/4}}, \sqrt{1+\sqrt{3/4}})$ and $(\sqrt{1+\sqrt{3/4}}, \sqrt{1-\sqrt{3/4}})$. Finally, a point used in a three-point lens measure mode is the point V located between the point S and the origin with coordinates (½,½).

In the preferred embodiment, anvils at the three fixed points S, T, and U of the spherometer extend upward from one side of the plate and are fixed accurately, precisely, and permanently at their prescribed locations to define a first measuring plane. The length of the anvils is selected to equal the length of the measuring anvil of the dial indicator when zeroed and retained in clamp 111 by the thumb screw 112.

For torsion measure operation anvils at points P, Q and R extend in the opposite direction from the plate 100 and the dial indicator 13 is reversed in its situation. The anvil for point R is made slightly adjustable so that a dial indicator set for zero as a spherometer may also be set to zero in torsion measure operation. Anvils for points P and Q are designed to snap into their receiving holes so that they may be removed and one of them, or another anvil snapped into position at the point V so that the points at O, V, and R will comprise a three-point lens measure. In torsion measure or spherometer operation it is desirable that a uniform contact pressure be applied. Ordinarily this is supplied by the force of gravity, the instrument resting upon the three fixed contact points in each configuration. It is preferred, therefore, that the center of gravity of the assembled instruments lie in both the triangles STU and PQR. Since the mass of the dial indicator 130 (FIGS. 13–16) is substantial, it is balanced by weights 114 and 115 to bring the center of gravity substantially to the point X between the point S and the line TU. FIG. 13 shows the instrument in the torsion-measure mode. The dial indicator 130 is affixed to the plate 100. The measuring anvil 131 of the indicator 130 extends downwardly in the same direction as the anvils 132, 133 and 134 located at points Q, R and P respectively. Anvil 133 has its height adjustable by its threaded sleeve 135.

Anvils 136, 137 and 138 for the spherometer mode of operation extend upward from the plate 100 and may be permanently fixed while anvils 134, 132 snap in and are retained by snap-rings as detailed in sectional view of FIG. 14 taken along the line 14—14 of FIG. 13. As shown in FIG. 14 the anvil 132 fits snugly in a bore 140 drilled accurately perpendicular to the axis 103. The anvil 132 has an upper land 141, a lower land 142 and a central groove 144. The upper land 141 is fitted with a snap-ring 146 which fits a snap-ring groove 147. Inserted in the plate 100 the snap-ring 146 engages a retention groove 148. The anvil 132 (and each of the other anvils) is tipped with a small sapphire ball 149 and its extension from the plate 100 is controlled by grinding the shoulder 150 on its flat-engaging surface 151. To remove the anvil 132 it is pressed out by a pin from the reverse side 152 of the plate 100.

FIG. 15 shows the arrangement of the instrument for operation as a spherometer. In this configuration the dial indicator 130 is placed in the reverse position so that its measuring anvil 131 extends outward from the surface 152 of the plate 100 and the anvils 136, 137 and 138 extend outward to engage the curved surface to be measured.

FIG. 16 shows the arrangement of the instrument as a three-point lens measure. In this configuration the dial indicator 130 is mounted as in FIG. 13 with its measuring point 131 extending outward from the face 103 of the plate 100. One of the removable anvils 132 is removed from the point Q and inserted at the point V. If it is necessary for the measurement, anvil 134, may, as shown in FIG. 16, be removed from the point P.

In the configuration of FIG. 15 where:

$$A_7 = \sqrt{2/3}'' \quad (25)$$

$$\Delta_7 = 0.001'' \quad (26)$$

$$K' = \frac{4}{3}\frac{A_7}{A^2_7} = \frac{.002}{\text{in.}} \quad (27)$$

$$R = \frac{1}{A_7} = 1000 \text{ inches} \quad (28)$$

and for a sphere,

Thus curvatures in reciprocal inches may be determined.

If it is desired to read curvature in opticians diopters a conversion factor is required. This may be built into the instrument by appropriate selection of the dimensions $A_3$, $A_7$, and $A_9$.

Fixtures and instruments of this type can be made in all sizes appropriate to the size of the surfaces to be measured; and one plate may be drilled to accommodate sets of fixed points appropriate for several progressively larger scale factors.

The embodiment of FIG. 17 is illustrative of an instrument accommodating scale factor variation by factors of two up to eight, and for metric and English units.

The unit comprises a plate 155 generally square in outline to enclose the two-inch square array of points for its largest torsion measure configuration. A dial indicator 156 is affixed to the plate 155 so that its measuring axis 156 is at a corner of the two-inch array, and the origin of a system of polar coordinates on the face 157 of the plate 155. This plate is drilled with thirty-three identical holes into which contact anvils as shown in FIG. 14 may be snapped. Seven holes are spaced along a base line 158 extending from the axis 156 parallel to an edge of the plate. Other holes are drilled on other rays deviating in direction by successive intervals fifteen degrees from the base line and at distances from the origin ranging from a minimum of one-half inch to a maximum of $\sqrt{8}$ inches.

The coordinates of the centers of these holes numbered 160–192 in FIG. 17 are as listed in Table I.

TABLE I

| Point | Angle (deg.) | Distance | Point | Angle (deg.) | Distance | Point | Angle (deg.) | Distance |
|---|---|---|---|---|---|---|---|---|
| 160 | 0 | $\sqrt{1/2}$ in. | 171 | 30 | $\sqrt{20}$ cm. | 182 | 60 | $\sqrt{2}$ in. |
| 161 | 0 | $\sqrt{5}$ cm. | 172 | 45 | $\sqrt{1/3}$ in. | 183 | 60 | 2 in. |
| 162 | 0 | 1 in. | 173 | 45 | 1 in. | 184 | 75 | 1/2 in. |
| 163 | 0 | $\sqrt{10}$ cm. | 174 | 45 | $\sqrt{10}$ cm. | 185 | 75 | 1 in. |
| 164 | 0 | $\sqrt{2}$ in. | 175 | 45 | $\sqrt{2}$ in. | 186 | 90 | $\sqrt{1/2}$ in. |
| 165 | 0 | $\sqrt{20}$ cm. | 176 | 45 | $\sqrt{20}$ cm. | 187 | 90 | $\sqrt{5}$ cm. |
| 166 | 0 | 2 in. | 177 | 45 | 2 in. | 188 | 90 | 1 in. |
| 167 | 15 | 1 in. | 178 | 45 | $\sqrt{40}$ cm. | 189 | 90 | $\sqrt{10}$ cm. |
| 168 | 30 | $\sqrt{10/3}$ cm. | 179 | 45 | $\sqrt{8}$ in. | 190 | 90 | $\sqrt{2}$ in. |
| 169 | 30 | $\sqrt{2/3}$ in. | 180 | 60 | $\sqrt{20/3}$ cm. | 191 | 90 | $\sqrt{20}$ cm. |
| 170 | 30 | $\sqrt{4/3}$ in. | 181 | 60 | $\sqrt{10}$ cm. | 192 | 90 | 2 in. |

From this configuration, lens measures may be assembled for which the radius $A_3$ has the following values: $\frac{1}{2}''$, $\sqrt{1/2}''$, $\sqrt{5}$ cm., $1''$, $\sqrt{10}$ cm. and $\sqrt{2}''$. Spherometers may be assembled for which $A_7$ has the following values: $\sqrt{1/3}''$, $\sqrt{10/3}$ cm., $\sqrt{2/3}''$, $\sqrt{20/3}$ cm. Torsion measures may be assembled for which $A_9$ has the following values: $\frac{1}{2}''$, $\sqrt{5/2}$ cm., $\sqrt{1/2}''$, $\sqrt{5}$ cm., $1''$, $\sqrt{10}$ cm. and $\sqrt{2}''$. As shown anvils 194 occupy holes 164, 177, 190, 166, 170 and 183 rendering the instrument a torsion measure for which:

$$A_9 = 1'' \quad (29)$$

convertible to a spherometer for which $$A_7 = \sqrt{1/3}'' \quad (30)$$

A weight 196 is affixed to the top of the plate 155 by a pin 197 which is inserted in an appropriate hole to effect balance.

Since scale factors are proportional to the squares of instrument radii, it follows that scale factors of a torsion measure employing a metric dial indicator will progress integrally as the areas of successive square arrays measured in square centimeters. Likewise convenient scale factors result when the areas of successive inch-measure torsion measures progress as integral numbers of square inches, or tenths of square inches. The like would be true of other standard measures of length and the corresponding standard area units.

In small instruments the preferred material for the plates 100 and 155 is high-carbon steel which is aged and hardened in the usual manner. For very large instruments a cast, or built-up frame may be substituted for the solid plate to provide the needed rigidity with less weight.

It will be understood that a large assortment of plates may be kept on hand as fixtures without a correspondingly large inventory of anvils and indicators, since these are readily interchangeable from one instrument or fixture to the next.

As various embodiments may be made of the above invention and as changes might be made in the embodiments above set forth, it is to be understood that all matter hereinbefore set forth or shown in the accompanying drawings is to be interpreted as illustrative and not in a limiting sense.

We claim:

1. A surface torsion measure comprising a rigid frame, three surface-contacting anvils fixed to said frame to present to a surface three points of contact at three of the corners of a square, a linear measure having a measuring axis, and means for fixing said measure to said frame to maintain said axis perpendicular to the base plane defined by said three points and to direct said axis through the fourth corner of said square.

2. A surface measure as defined by claim 1 wherein the area of said square is an integral number of standard area units.

3. A surface measure as defined by claim 1 wherein said frame is a flat plate, wherein said anvils are fixed to said plate by three cylindrical holes through said plate with axes perpendicular to said plane and passing through said three corners, and wherein said means comprise a fourth cylindrical hole.

4. A surface measure as defined by claim 3 wherein the area of said square is an integral number of standard area units.

5. A measure as defined by claim 1 in further combination with fourth and fifth surface contacting anvils fixed to said frame to present to a surface two points of contact at two vertices of an equilateral triangle which is in a plane substantially parallel to said base plane and of which the third vertex is on said axis, together with a sixth surface-contacting anvil presenting a point of contact at the center of said triangle.

6. A measure as defined by claim 2 in further combination with fourth and fifth surface contacting anvils fixed to said frame to present to a surface two points of contact at two vertices of an equilateral triangle which is in a plane substantially parallel to said base plane and of which the third vertex is on said axis, together with a sixth surface-contacting anvil presenting a point of contact at the center of said triangle.

7. A measure as defined by claim 3 in further combination with fourth and fifth surface contacting anvils fixed to said frame to present to a surface two points of contact at two vertices of an equilateral triangle which is in a plane substantially parallel to said base plane and of which the third vertex is on said axis, together with a sixth surface-contacting anvil presenting a point of contact at the center of said triangle.

8. A measure as defined by claim 4 in further combination with fourth and fifth surface contacting anvils fixed to said frame to present to a surface two points of contact at two vertices of an equilateral triangle which is in a plane substantially parallel to said base plane and of which the third vertex is on said axis, together with a sixth surface-contacting anvil presenting a point of contact at the center of said triangle.

9. A torsion-measurement fixture comprising a generally flat plate having at one corner thereof means to engage and hold a standard dial indicator with its measuring axis perpendicular to said plate, and having associated with said means a first triad of surface-contacting points defining a base plane and situated at three corners of a square and such that the fourth corner of said square is on said axis, and a second triad of surface contacting points in a secondary plane parallel to said base plane, two of said second triad occupying vertices of an equilateral triangle the third vertex of which is at the intersection of said axis and said secondary plane, the third of said second triad being at the center of said triangle.

10. A fixture as defined by claim 9 wherein the area of said square is an integral number of standard area units.

11. A fixture as defined by claim 9 wherein said plate has precisely flat parallel faces, and wherein said first triad consists of the tips of three identical anvils fitted into and indexed to one of said faces.

12. A fixture as defined by claim 11 wherein the area of said square is an integral number of standard area units.

13. A fixture as defined by claim 9 wherein said triads consist of the tips of identical anvils fitted into and indexed to said faces.

14. A fixture as defined by claim 13 wherein the area of said square is an integral number of standard area units.

15. A fixture as defined by claim 10 wherein the area of said square multiplied by half the square root of three equals the area of said triangle.

16. A fixture as defined by claim 11 wherein the area of said square multiplied by half the square root of three equals the area of said triangle.

17. A fixture as defined by claim 12 wherein the area of said square multiplied by half the square root of three equals the area of said triangle.

18. A fixture as defined by claim 13 wherein the area of said square multiplied by half the square root of three equals the area of said triangle.

19. A fixture as defined by claim 14 wherein the area of said square multiplied by half the square root of three equals the area of said triangle.

20. A fixture as defined by claim 10 wherein the area of said square multiplied by one-fourth the square root of three equals the area of said triangle.

References Cited

UNITED STATES PATENTS

| | | | |
|---|---|---|---|
| 1,093,307 | 4/1914 | Beckey | 33—170 |
| 1,151,635 | 8/1915 | Webb. | |
| 1,563,468 | 12/1925 | Carreau. | |

WILLIAM D. MARTIN, Jr., Primary Examiner

U.S. Cl. X.R.

33—174